United States Patent [19]

Graves

[11] 4,425,370

[45] Jan. 10, 1984

[54] PROCESS FOR MAKING MARGARINE-TYPE FOOD PRODUCT

[75] Inventor: Frederic A. Graves, Ham Lake, Minn.

[73] Assignee: Land O'Lakes, Inc., Minneapolis, Minn.

[21] Appl. No.: 339,378

[22] Filed: Jan. 15, 1982

[51] Int. Cl.³ .......................... A23D 3/00; A23D 3/02
[52] U.S. Cl. ...................................... 426/603; 426/604
[58] Field of Search ................................ 426/603, 604

[56] References Cited

U.S. PATENT DOCUMENTS

| | | | |
|---|---|---|---|
| 263,042 | 8/1882 | Hobbs | 426/603 |
| 263,199 | 8/1882 | Nathan | 426/603 |
| 264,714 | 9/1882 | Lauferty | 426/603 |
| 265,833 | 10/1882 | Lauferty | 426/603 |
| 285,878 | 10/1883 | Cochran | 426/603 |
| 611,495 | 9/1898 | Liebreich | 426/603 |
| 1,024,009 | 4/1912 | Kronenberger | 426/603 X |
| 1,028,804 | 6/1912 | Winship et al. | 426/603 X |
| 1,386,475 | 8/1921 | Wall | 426/603 |
| 1,400,341 | 12/1921 | Ashby | 426/603 |
| 1,432,699 | 10/1922 | Kinzer | 426/603 |
| 1,495,734 | 5/1924 | Grindrod | 426/603 |
| 1,663,913 | 3/1928 | Leroudier | 426/603 |
| 2,024,647 | 12/1935 | Joyce | 99/13 |
| 2,357,896 | 9/1944 | Howe | 99/121 |
| 2,485,634 | 10/1949 | Vahlteich et al. | 99/119 |
| 2,745,750 | 5/1956 | Shafer et al. | 99/122 |
| 3,189,465 | 6/1965 | Oakley et al. | 99/122 |
| 3,324,551 | 6/1967 | Mnilk et al. | 31/89 |
| 3,716,378 | 2/1973 | Bratland | 426/603 X |
| 3,922,376 | 11/1975 | Strinning et al. | 426/603 |
| 3,962,464 | 6/1976 | Sozzi | 426/43 |
| 3,982,039 | 9/1976 | Scibelli et al. | 426/603 |
| 4,000,332 | 12/1976 | Strinning et al. | 426/603 |
| 4,051,269 | 9/1977 | Strinning | 426/603 |
| 4,087,564 | 5/1978 | Poot et al. | 426/603 |
| 4,112,132 | 9/1978 | Badertscher et al. | 426/603 |
| 4,177,293 | 12/1979 | Forman et al. | 426/43 |
| 4,209,546 | 6/1980 | Johansson | 426/603 |
| 4,315,955 | 2/1982 | Cramer | 426/603 X |

FOREIGN PATENT DOCUMENTS 578939 11/1977 U.S.S.R.

OTHER PUBLICATIONS

Dixon et al; "A Comparison of Five Methods of Production of Dairy Blend," Dec. 21, 1979.
University of Wisconsin Process (Flow Diagram).

*Primary Examiner*—Robert A. Yoncoskie
*Attorney, Agent, or Firm*—Kinney, Lange, Braddock, Westman & Fairbairn

[57] ABSTRACT

A process for producing a margarine-type food product includes the steps of: blending a dairy substance such as skim milk with a hydrogenated vegetable oil in approximately a 60/40 ratio; processing the skim milk/oil mixture through a homogenizer to obtain an oil globule size range essentially similar to a fat globule size range found in dairy cream; blending a dairy cream with the homogenized skim milk/oil mixture; and processing the mixture of dairy cream and skim milk/oil through a butter churning process.

24 Claims, 2 Drawing Figures

PROCESS FOR MAKING MARGARINE-TYPE FOOD PRODUCT

BACKGROUND OF THE INVENTION

1. Field of the Invention

The present invention relates to processes for producing butter/margarine products.

2. Description of the Prior Art

Blended butter/margarine products are quite old. The Hodds U.S. Pat. No. 263,042 issued on Aug. 22, 1882 describes a process wherein a fraction of vegetable oil is subjected to pressure and temperature making the vegetable oil compatible with an "animal oleo margarine." Both the "animal oleo margarine" and the vegetable oil are melted and mixed with cream before emulsionizing. The mixture is then churned to obtain the "artificial butter" of the Hodds patent.

The Howe U.S. Pat. No. 2,357,896, also describes a process in which a butter/margarine blend is produced by simply mixing the butter and the vegetable oil in a molten state.

A further refinement in the production of a butter/margarine blend included the addition of the vegetable oil to the cream during the churning process. The addition of the oil during the churning step is discussed in the Lauferty U.S. Pat. Nos. 264,714 and 265,833 and the Wall U.S. Pat. No. 1,386,475. In both Lauferty patents, the oleo margarine is added to the cream after the cream has been churned for approximately five minutes. In addition, in the Lauferty U.S. Pat. No. 264,714, the oleo margarine was agitated in a tank prior to addition to the cream to break up the globular formations in the oil. In the Wall patent, cocao oil is added to the cream at the point of incipient butter formation.

Other prior art patents, namely the Cochran U.S. Pat. No. 285,878, the Libreich U.S. Pat. No. 611,495, the Winship et al U.S. Pat. No. 1,028,804 and the Vahlteich U.S. Pat. No. 2,485,634, describe processes wherein the vegetable oil is mixed with the cream or milk prior to churning.

Still other processes are described in other patents wherein the vegetable oil/milk mixture is passed through a homogenizer or is emulsified. In the Ashby U.S. Pat. No. 1,400,341, an 80% vegetable oil and 20% milk mixture is passed through an emulsifying machine at approximately 68° prior to churning. In the Forman et al U.S. Pat. No. 4,177,293, a lowfat content butter/spread is produced by starting with cream which can include a vegetable oil, innoculating the mixture and then homogenizing. After homogenization, fermentation is permitted and then the mixture is homogenized a second time. The product of the Forman et al process is then directly packaged.

However, with the exception of the previously mentioned Lauferty U.S. Pat. No. 264,714, all of the processes described in the above-mentioned patents show little concern for globule size within the oil and the cream. The Johansson U.S. Pat. No. 4,209,546 teaches that vegetable oil when introduced into a cream stream of a butter/margarine blend process needs to be gently and carefully added to the cream stream so that the fat globules of the cream and the oil respectively, will not be broken up into minute fat globules. The minute fat globules decrease churning efficiency of the churning process since the globules do not participate in the formation of edible fat, but instead are taken out with buttermilk which is a byproduct of the churning process.

Churning efficiency has not been emphasized in the majority of the processes described in the above-mentioned patents in the production of butter/margarine blends. Typically, butter/margarine blends are churned using the same churning processes as are used to churn butter. With increased labor and operating costs, increasing the efficiency of the churning process to handle butter/margarine blends would be of a great advantage.

SUMMARY OF THE INVENTION

The process of the present invention produces a butter/margarine blended product in a manner that allows a typical butter churning process to churn the butter/margarine blend at optimum capacity. The process includes initially blending a dairy substance such as skim milk with a hydrogenated vegetable oil. The skim milk/vegetable oil mixture is then processed through a homogenizer to obtain an oil globule size range substantially the same as the butter fat globule size range normally found in dairy cream. After homogenization, the skim milk/vegetable oil mixture is blended with a dairy cream (containing butterfat). The dairy cream and skim milk/vegetable oil mixture is then processed through a typical butter churning process. The butter churn is operated at optimum capacity since the oil fat globules and the butterfat globules are approximately the same size resulting in the same rate of agglomeration in the butter churn. Consequently, the production of a butter/margarine blend can be carried on at the same rate as the production of butter through a typical butter churn.

DETAILED DESCRIPTION OF THE PREFERRED EMBODIMENTS

Figure 1:
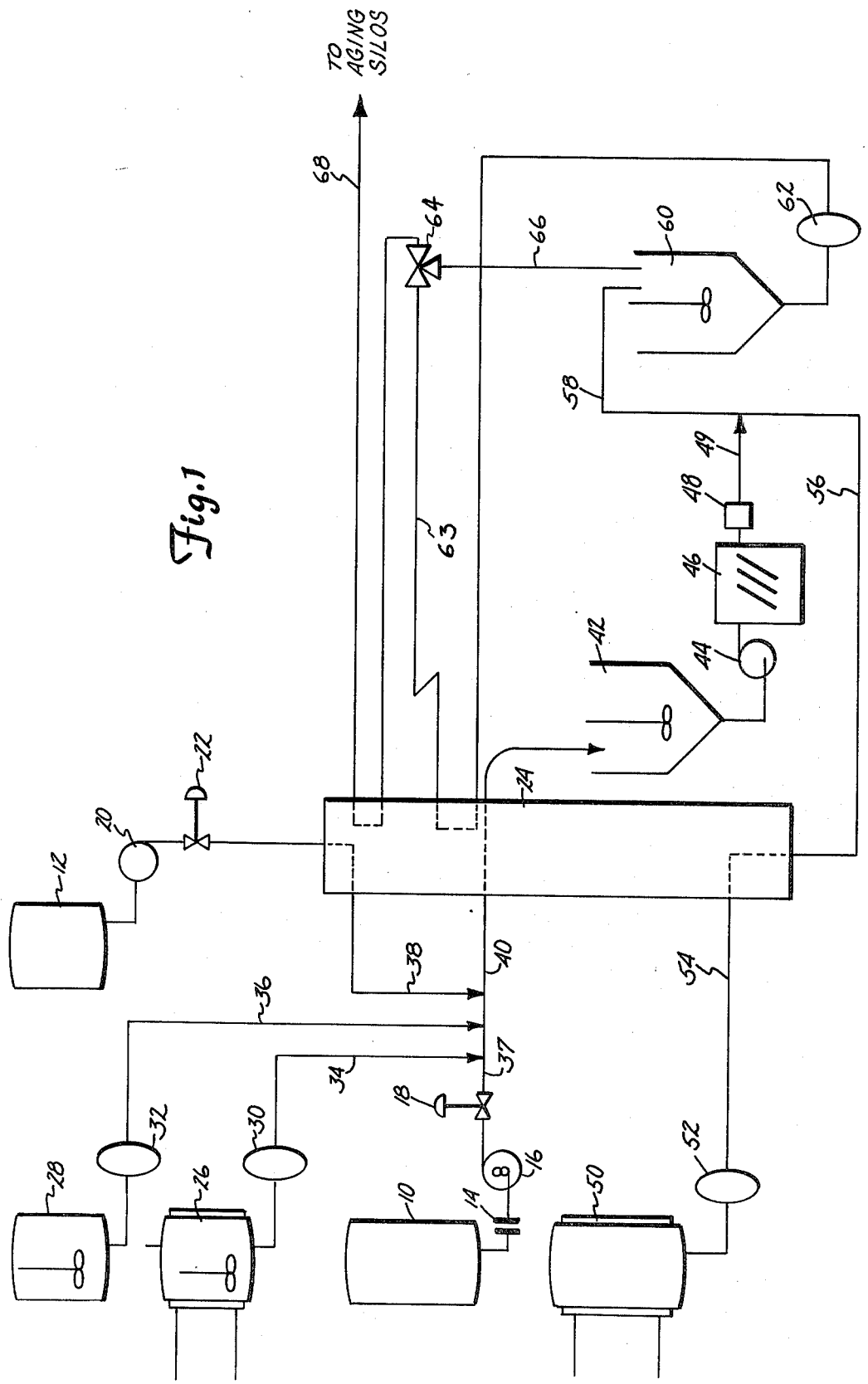
FIG. 1 is a diagrammatical view illustrating the process of the present invention.

The butter/margarine blend process of the present invention is illustrated in the flow diagram in FIG. 1. Initially, a hydrogenated vegetable oil such as corn or soy oil is preferably stored at approximately 110° F. in a storage tank 10. Alternatively, the vegetable oil may be directly loaded from a truck unloading station. The skim milk, to be blended subsequently with the vegetable oil, is stored in a refrigerated silo 12 at approximately 40° F. Alternatively, buttermilk or other fluid dairy substance having a fat content from 0 to 8% by weight with a preferred fat content range of 0 to 4% can be substituted for the skim milk in silo 12.

The vegetable oil in silo 10 is filtered through oil filter 14 and pumped from the silo 10 with a centrifugal pump 16 while being controlled by a suitable flow control system 18. The skim milk is similarly pumped by a centrifugal pump 20 while being controlled by a suitable flow control system 22. The skim milk is passed through a plate heat exchanger 24 raising the skim milk's temperature from approximately 40° F. to approximately 120° F.

Color, vitamins and flavor are stored in a tank 28 and are metered into the process through metering pump 32. The color normally used is Beta Carotene.

Tank 26 holds emulsifiers. Normally two types of emulsifiers are used. The first type of emulsifiers are mono and diglycerides. The second emulsifier is lecithin. Both types of emulsifiers are dispersed in a hydrogenated corn oil having a melting point of about 104° F. However, the emulsifiers are not required for successful operation of the process of the present invention. The tank 26 preferably has a hot-water jacket to keep the tank temperature above 104° F., in a preferred range of 110°–130° F. with a more preferred temperature of approximately 120° F.

The ingredients of tank 26 is pumped by metering pump 30. The ingredients of tanks 26 and 28 are pumped through lines 34 and 36, respectively, and are blended into the vegetable oil stream 37. Preferably, after the ingredients of tanks 26 and 28 have been added to the vegetable oil, the heated skim milk in silo 12 is added to the vegetable oil stream 37 through line 38 to form a skim milk/vegetable oil stream 40. The skim milk and vegetable oil are added in a preferred concentration of 60% skim milk and 40% vegetable oil by weight. The process of the present invention has been successfully practiced using a vegetable oil concentration range of approximately 38 to 45% with a preferred range of 39 to 42.7%. The temperature of stream 40 is approximately 115° F., due to the blending of the skim milk and vegetable oil streams.

The skim milk/vegetable oil stream 40 is then heated through the plate heat exchanger 24 to approximately 160° F. A surge tank 42 receives the heated skim milk/vegetable oil mixture. The surge tank 42 preferably includes an agitator to help minimize separation of the skim milk and the vegetable oil.

A centrifugal pump 44 pumps the skim milk/vegetable oil mixture into a two stage homogenizer 46. The two state homogenizer 46 is a conventional homogenizer. In one working embodiment of the process a Gaulin homogenizer, marketed by the Gaulin Corporation, has a first stage operated at approximately 400 psi and a second stage operated at approximately 200 psi. The flow through the homogenizer is controlled by a suitable magnetic flow meter 48.

The homogenizer processes the skim milk/vegetable oil mixture, breaking up the oil fat globules to a size substantially equal to the size range of butterfat globules. Typically, the size range of butterfat globules in dairy cream is from 2 to 20 microns (which is typically the "natural" size range of the butterfat globules).

The substantially equalization of size of the vegetable oil fat globules with the butterfat globules is an important step in the process of the present invention and persons skilled in the art will realize that although a specific homogenizing unit has been referred to, other suitable homogenizing units that are capable of breaking up oil fat globules to a size range of butterfat globules are within the scope of the present invention.

The cream used in the process of the present invention has a butterfat content of approximately 40% by weight and is typically stored within a silo 50. The silo 50 is preferably refrigerated and has an agitator for keeping the cream at approximately 40° F. The cream at 40° F. is pumped from the silo 50 through a metering pump 52 into a cream stream designated as 54. The cream stream 54 passes through the plate heat exchanger 24 and is heated to approximately 120° F., producing a heated cream stream 56.

The heated cream stream 56 is blended with the homogenized vegetable oil stream 49 in an approximate weight ratio of 60% vegetable oil stream and a 40% cream stream. Typically, the two streams are blended using a suitable inline static mixer or other blending device. The resulting blended cream/vegetable oil stream has an approximate fat content of 40%.

Generally, when mixing a vegetable oil with butterfat using the prior art processes, a total maximum fat content of 39% has been attainable in the cream/vegetable oil mixture. However, using the process of the present invention and by increasing the fat content of either the skim milk/vegetable oil stream or the cream stream, a maximum fat content of 40 to 42% of the cream/vegetable oil mixture can be achieved.

The cream/vegetable oil stream 58 flows into a second surge tank 60. The second surge tank 60 preferably has an agitator which agitates the cream/vegetable oil mixture, minimizing any agglomeration of the fat globules. The cream/vegetable oil mixture is then pumped through a positive displacement pump 62 to the plate heat exchanger 24 and heated from approximately 140° F. to an approximate range of 172° F. to 198° F. with a preferred range of 190°–194° F. and held at that range for approximately 20 seconds, forming a heated stream 63.

A diverter valve 64 is operated to ensure that any unpasteurized product is diverted back into the tank 60 and reprocessed through the plate heat exchanger 24. Typically, when the temperature of the stream 63 exiting the plate heat exchanger is below the pasteurization temperature, the stream 63 is diverted into the surge tank 60 until the temperature of the stream 63 rises sufficiently to indicate pasteurization is taking place.

Figure 2:
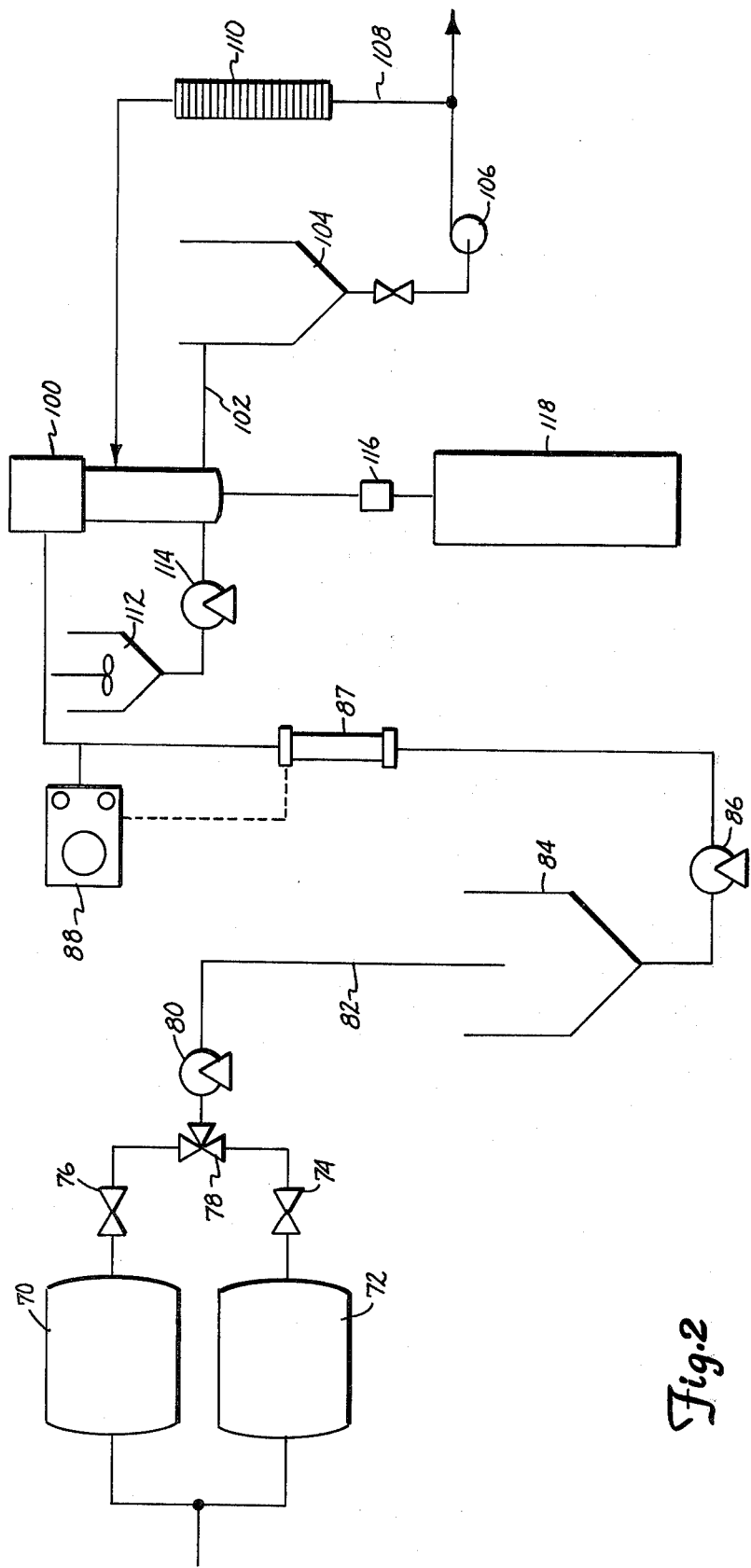
FIG. 2 is a diagrammatical view illustrating the churning process of the present invention.

After pasteurization, the stream 63 is cooled back to approximately 40° F. The cooled cream/vegetable oil stream then enters a conventional churning process, as illustrated in FIG. 2. Although a specific churning process is illustrated in FIG. 2, it will be understood by those skilled in the art that the stream 68 is capable of being processed by any conventional butter churning process and the present invention is not limited to the following description.

The cream/vegetable oil stream 68 enters either a first or a second aging silo 70 or 72. In operation, first one silo, such as silo 70, is filled with the cream/vegetable oil mixture and allowed to age 8 to 16 hours. When the first aging silo is filled the cream/vegetable oil stream is diverted by a suitable valving mechanism to the second aging silo 72. The second silo is filled while the contents of the first is aging. When the first silo has aged, the aged cream/vegetable oil mixture is drawn from the first silo 70. When the first silo 70 is empty the cream/vegetable mixture is then drawn from the second silo 72 and the first silo is filled again. The above filling and drawing sequence results in a continuous flow of aged cream/vegetable oil to the churning process.

The aged cream/vegetable oil mixture is drawn from the aging silos 70 or 72 preferably by a positive displacement pump 80. From the positive displacement pump 80, a line 82 conveys the cream/vegetable oil mixture to a ballast hold tank 84. From the ballast tank 84, a second positive displacement pump 86 pumps the cream/vegetable oil mixture through a heat exchanger 87 such that the cream/vegetable oil mixture is heated to a temperature range of 47°–48° F. The ballast tank 84 provides a head pressure to the pump 86 to ensure a constant flow rate to a continuous butter churn 100. A suitable temperature recorder and controller 88 controls the temperature of the stream exiting heat exchanger 87. The heat exchanger 87, although is shown as positioned after the tank 84, can be positioned before the tank 84.

After the heat exchanger 87, the cream/vegetable oil mixture flows into a continuous butter churn 100. Buttermilk is separated and is drawn from the churn 100 through by product stream 102 and into a surge tank 104. The buttermilk is then pumped by a centrifugal pump 106 to a suitable storage for other uses. The butter churn 100 is a typical butter churn, designed for operating at maximum efficiency when processing natural cream (with butterfat). With the vegetable oil fat globules being in the same size range as the butterfat globules, the butter churn is operable at maximum efficiency.

The churning process generates a significant amount of heat. To help keep the cream/vegetable oil mixture from becoming too fluid during churning, a portion of the buttermilk is diverted through line 108 which contains a plate heat exchanger 110. The buttermilk is cooled to approximately 40° F. and is reintroduced into a forward section of the butter churn 100 to help keep the churning temperature down. Typically, the churning temperature needs to be at 56 F. or lower.

Salt may be optionally added by the addition of a salt slurry held in an agitated vat 112. Typically, the slurry is a 50-60% salt slurry in water and is injected into the butter churn 100 after the cream/vegetable oil mixture has been churned to a butter/margarine blend. A suitable metering type pump 114 injects the salt slurry and or flavor addition, e.g., starter distillate, lactic acid, into the butter churn 100.

After the butter churn 100 the butter/margarine mixture is conveyed to a "butter boat" 116, sometimes referred to as a "stuffing box." The butter boat is typically a tank having a pair of twin augers which feed the butter to a positive displacement pump, which in turn feeds the butter/margarine blend to a printer and a wrapping and labeling machine indicated as 118. However, when the machine 118 breaks down, the butter boat turns into a holding or surge tank accepting the butter/margarine blend from the continuous butter churn 100 until the machine 118 can be repaired and started up again.

The following example is illustrative only and is not intended to limit the present invention. The example is submitted in order to demonstrate more explicitly the process of the present invention.

EXAMPLE

In a pilot plan process, the vegetable oil and other minor ingredients such as emulsifiers, color and flavoring were blended together using a multiple head metering pump. The flow rate of the vegetable oil was approximately 9.48 lbs./minutes with the emulsifiers being added at a rate of 0.413 lbs./minute and the color and flavoring added at a rate of 0.075 lbs./minute to equal a total flow rate of 9.968 lbs./minute. The emulsifiers, color and flavoring had been previously diluted in vegetable oil and the flow rates mentioned above included said oil. Buttermilk at 40° F. was also metered using one of the heads of the same multiple head metering pump at a flow rate of 14.95 lbs./minute with the vegetable oil mixture to produce a 60% buttermilk/40% vegetable oil mixture having a volumetric flow rate of approximately 3 gallons/minute. The buttermilk/vegetable oil mixture was then heated in an agitating tank to 150°-160° F. The heated vegetable oil mixture is then processed through a two stage homogenizer.

A 40% butterfat cream stream at approximately 40° F. flowing at 2 gallons/minute was blended with the homogenized buttermilk/vegetable oil stream through a second multiple head metering pump. The two streams were mixed with an inline static mixer forming a cream/vegetable oil stream having a flow rate of 5 gallons/minute. The fat globules in the blended 60/40, vegetable/oil/cream stream were measured and ranged in size from approximately 2.6 microns to 9.3 microns with the average globule size being approximately 5.3 microns. In comparison, the raw cream used to produce the blend had fat globules ranging in size from approximately 2.7 to 8.0 microns with the average globule size being approximately 4.0.

The cream/vegetable oil stream was then pasteurized at 190° F. for 20 seconds, and cooled to 40° F., and allowed to age in an aging tank before being churned.

The process of the present invention produces a quality butter/margarine blend product exhibiting less "oiling off" (forming a pool of oil) than butter/margarine blends produced previously. At approximately 72° to 75° F., the product of the present invention does not melt as quickly as butter/margarine blend products produced by other processes.

Another distinguishing feature of the butter/margarine product of the present invention is its greater firmness above 60° F. than butter/margarine blend products produced by other processes.

Although the present invention has been described with reference to preferred embodiments, workers skilled in the art will recognize that changes may be made in form and detail without departing from the spirit and scope of the invention.

What is claimed is:

1. A process for the production of a margarine-type food product wherein a fluid hydrogenated vegetable oil is blended with a dairy cream containing butterfat globules, the improvement comprising:
   processing the fluid vegetable oil at a minimum concentration of approximately 38% by weight in a milk or a milk-derived fluid having a fat content range of approximately 0 to 8% by weight prior to blending with the dairy cream, the vegetable oil being so processed that the globule size range of the vegetable oil is substantially similar to a natural globule size range of the butterfat globules of the dairy cream.

2. The process of claim 1 wherein the vegetable oil blend is processed through a homogenizer.

3. The process of claim 1 wherein the vegetable oil concentration is in the approximate range of 38 to 45% by weight of the combined vegetable oil and milk or milk-derived fluid.

4. The process of claim 3 wherein the vegetable oil concentration is in the approximate range of 39 to 42.7% by weight of the combined vegetable oil and milk or milk-derived fluid.

5. The process of claim 4 wherein the vegetable oil and the milk or milk-derived fluid are mixed in a ratio of approximately 40% vegetable oil and 60% dairy fluid.

6. The process of claim 3 wherein the vegetable oil and milk or milk-derived fluid, after homogenization, are mixed with the cream in a 60/40 ratio.

7. The process of claim 1 wherein the dairy cream has a butterfat content of approximately 40% by weight.

8. The process of claim 1 wherein the fat content range of the milk or milk-derived fluid is 0 to 4% by weight.

9. The process of claim 8 wherein the milk or milk-derived fluid is skim milk.

10. The process of claim 8 wherein the milk or milk-derived fluid is buttermilk.

11. A food product exhibiting less oiling off and greater firmness, the product being prepared by the process of claim 1.

12. A process for the production of a margarine-type food product, the process comprising:
   blending a milk or a milk-derived fluid having a fat content range of 0 to 8% by weight with a fluid hydrogenated vegetable oil to form a oil mixture with a vegetable oil concentration of at least approximately 38% by weight;
   processing the oil mixture through a homogenizer to obtain a vegetable oil globule size range substantially similar to natural size range of butterfat globules in a dairy cream;
   blending the dairy cream containing butterfat globules with the oil mixture after processing through the homogenizer forming a cream/oil mixture; and
   processing the cream/oil mixture through a butter churn.

13. The process of claim 12 wherein the oil mixture has an approximate vegetable oil concentration range of 38 to 45% by weight of the oil mixture.

14. The process of claim 13 wherein the vegetable oil concentration is in the approximate range of 39 to 42.7% by weight of the oil mixture.

15. The process of claim 14 wherein the oil mixture is approximately 60% milk or milk-derived fluid and 40% vegetable oil.

16. The process of claim 12 wherein the oil mixture is blended after homogenization with the cream in a 60/40 ratio.

17. The process of claim 12 wherein the dairy cream is approximately 40% butterfat by weight.

18. The process of claim 12 wherein the churning process includes:
   aging the cream/oil mixture;
   adjusting the cream/oil mixture's temperature for churning; and
   churning the cream/oil mixture with a butter churn.

19. The process of claim 12 and further including:
   adding color and flavoring to the vegetable oil before homogenization.

20. The process of claim 12 and further including adding an emulsifier to the vegetable oil prior to blending with the milk or milk-derived fluid.

21. The process of claim 12 wherein the fat content range of the milk or milk-derived fluid is 0 to 4% by weight.

22. The process of claim 20 wherein the milk or milk-derived fluid is skim milk.

23. The process of claim 20 wherein the milk or milk-derived fluid is buttermilk.

24. A food product exhibiting less oiling off and greater firmness, the product being prepared by the process of claim 12.

* * * * *